Jan. 29, 1924.  1,481,808
J. P. ROACH
COTTON PICKER
Filed May 15, 1922    2 Sheets-Sheet 1

INVENTOR.
James P. Roach

Jan. 29, 1924.  
J. P. ROACH  
COTTON PICKER  
Filed May 15, 1922

INVENTOR.  
James P. Roach

Patented Jan. 29, 1924.

1,481,808

UNITED STATES PATENT OFFICE.

JAMES P. ROACH, OF NEW YORK, N. Y.

COTTON PICKER.

Application filed May 15, 1922. Serial No. 560,910.

*To all whom it may concern:*

Be it known that I, JAMES P. ROACH, a citizen of the United States, residing at New York, in the county of New York and State of New York, have invented new and useful Improvements in Cotton Pickers; and I do hereby declare the following to be a full, clear, and exact description of the invention, such as will enable others skilled in the art to which the invention appertains to make and use the same.

This invention relates to pneumatic cotton pickers and has particular reference to a mechanical means for stripping cotton from the boll, the same being in the nature of an improvement over a similar invention set forth in Letters-Patent of the United States, No. 1,366,837 granted January 25th, 1921.

The invention contemplates a simple and effective means located within the intake mouth of a suction nozzle for stripping the cotton from the boll and advancing the cotton within the nozzle to be acted upon by the draft or suction which functions to remove and carry it into a suitable receptacle.

In the prior patent, a single picking finger or set of fingers was employed for accomplishing the stripping and advancing operation but it has been found by actual experiment that one finger or set of fingers tends to push the cotton away from the mouth in some instances. In order to overcome this objection, it is an object of the present invention to provide oppositely acting complementary fingers or sets of fingers which are designed to co-act with one another to grip and advance the cotton into the nozzle.

A further object resides in the provision of means for driving and effecting the advancement of the fingers toward each other at a high rate of speed during the initial gripping and stripping operation and for driving the same at a reduced rate of speed and effecting relative separation of the fingers during the releasing action under the influence of the draft or suction.

With the above recited and other objects in view some of which will be more apparent as the nature, purpose and operation is better understood from the following description, appended claims and accompanying drawings, the invention resides in the novel construction, combination, and arrangement of parts set forth therein.

In the drawings:—

Figure 1:
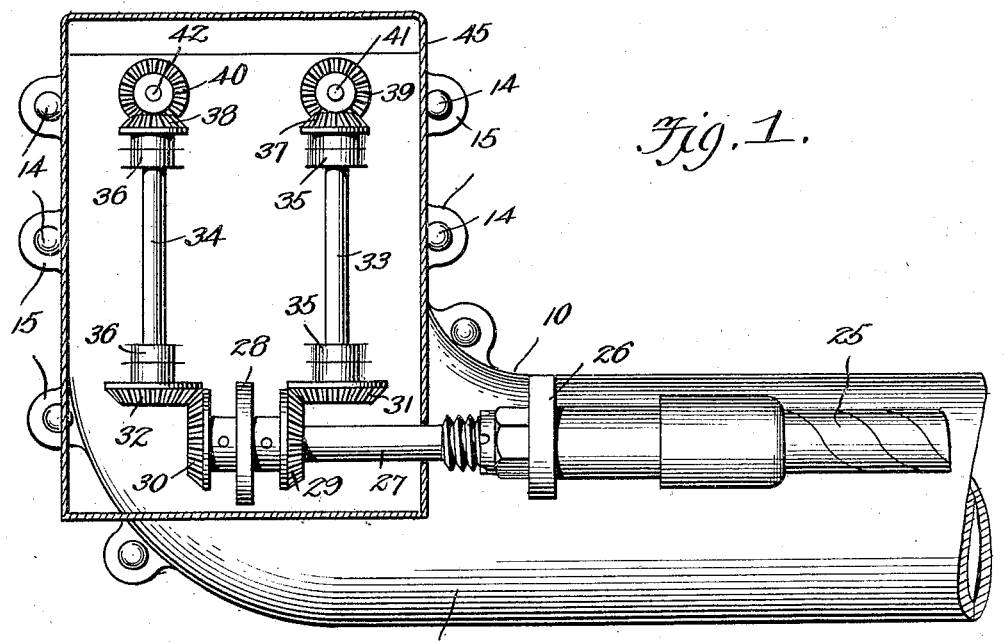
Figure 1, is a side elevation of a picker nozzle or head with the driving mechanism housing shown in section to disclose the underlying structure.
Figure 2:
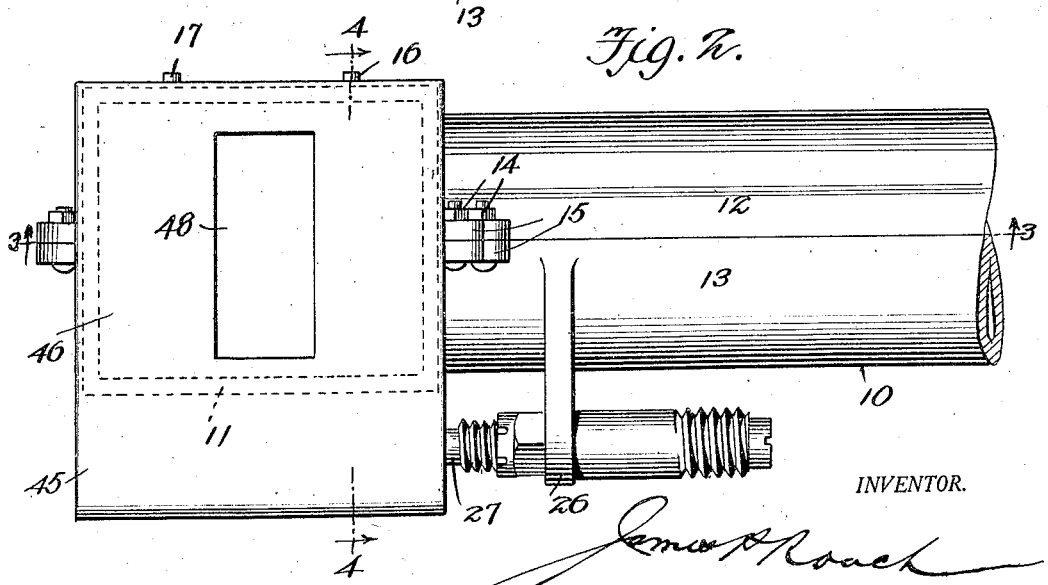
Figure 2, is a plan view thereof.
Figure 3:
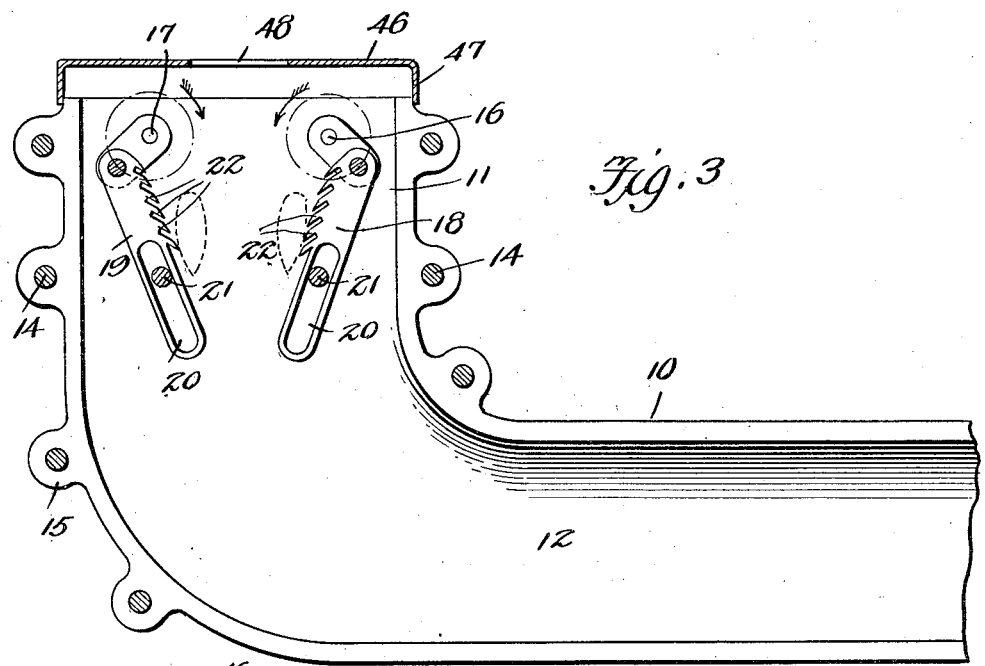
Figure 3, is a longitudinal sectional view taken approximately on the line 3—3 of Figure 2.
Figure 4:
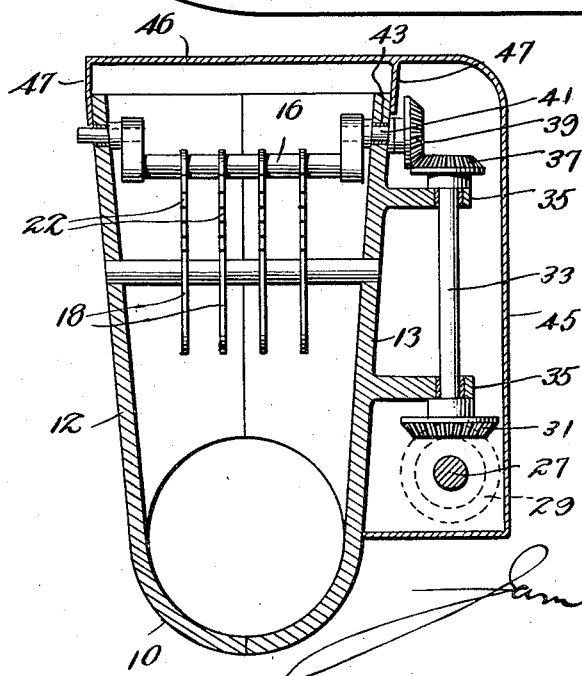
Figure 4, is a transverse sectional view taken approximately on line 4—4 of Figure 2.

Referring to the drawings by characters of reference 10 designates a suction nozzle which is provided with an upturned or angularly disposed intake extremity 11 and which is constructed of mating sections 12 and 13 secured to each other by means of bolts or rivets 14 extending through complementary apertured lugs 15 formed on said sections. A pair of transversely disposed crank arms 16 and 17 are mounted within the mouth of the intake end for rotation. A plurality of picking elements 18 and 19 are journaled at one extremity on each of said cranks. The opposite extremity of each picking element is longitudinally slotted as at 20 and the slots of each set of picking fingers have passed therethrough a transverse stationary guide pin 21. The confronting edges of each element 19 is provided with forwardly and downwardly protruding teeth 22, the formation of which are preferably identical with the formation of the teeth of a gin saw although not absolutely restricted to such a formation. Upon rotation of the cranks 16 and 17 toward each other in the direction indicated by the arrows in Figure 3, the elements 18 and 19 will be actuated to cause the picking teeth to describe a substantially oval path of movement longitudinally with respect to the intake mouth. This movement of the picking fingers brings the same at the outermost point relatively close together to effect a gripping action on the cotton when the nozzle is brought into proximity therewith. The outermost limit of the movement effects the travelling of the picking fingers or teeth in a small arcuate path at a high rate of speed due to the slot and pin connections 20 and 21. Further continued movement in the same direction of the cranks at a constant rate of speed will effect the movement of the teeth 22 in relatively large arcuate or convex paths at a reduced rate of speed which movement subjects the cotton to the action of the suction or draft for a longer period of time or in any event, for a long enough period of time to completely effect its removal from the teeth prior to their change in direction of movement toward the opposite or outer end of the nozzle. Continued rotation of the crank shafts and the slot and pin connections effect relative movement of the teeth away from each other in a substantially concave path which insures a positive release of cotton adhering thereto.

The means for driving the crank shafts 16 and 17 consists of a flexible shaft contained in a housing or flexible tubing 25 which leads to a source of driving power. The flexible shaft extends through a supporting bracket 26 on the section 13 of the nozzle and connects with a stub shaft section 27 in a bearing 28 provided on the side of the section 13. A pair of reversely facing mitre gears 29 and 30 are keyed to the shaft 27 and respectively mesh with mitre gears 31 and 32 carried by vertical shafts 33 and 34 which are mounted in aligned bearings 35 and 36 formed on the side of the section 13. Mitre gears 37 and 38 are keyed to the upper ends of the shafts 33 and 34 and the same respectively mesh with mitre gears 39 and 40 secured to the extremities 41 and 42 of the crank shafts 16 and 17, which extremities extend through bearing openings 43 in the side wall of the section 13. When the flexible shaft functions to rotate the stub shaft 27, the crank shafts will be simultaneously driven in opposite directions through the gearing heretofore described. The gearing is covered by a housing 45 which is provided with a laterally projecting upper wall 46 having a depending marginal flange 47 which fits over the upper or intake end of the extremity 11 of the nozzle. The wall 46 is provided with an aperture or receiving opening 48 through which the cotton is admitted to the nozzle during the picking operation.

What is claimed as new is:—

1. In a pneumatic cotton picker, means for stripping cotton from the boll comprising complementary picking elements mounted for movement in the intake of the suction nozzle and means for positively driving the same at a high rate of speed to effect their advancement toward each other during the stripping action and at a reduced rate of speed and away from each other during the releasing action.

2. The combination with the suction nozzle of a pneumatic picker, of means for stripping the cotton from the boll and advancing the same into the nozzle, comprising picking elements journalled in the intake end thereof and means for driving the same to cause the teeth thereof to travel in arcuate paths toward each other and at a high rate of speed during the stripping action and in a relatively large convex path at a reduced rate of speed during the releasing action, the latter movement serving to dispose the teeth of said elements in the direction of travel of the suction draft through the nozzle to facilitate complete removal of the cotton therefrom by the suction.

3. The combination with the suction nozzle of a pneumatic picker, of means for stripping the cotton from the boll, comprising a pair of crank shafts journaled transversely within the intake end of the nozzle, means for simultaneously driving the same at a constant rate of speed in opposite directions, complementary stripping elements having teeth on their confronting sides mounted for swinging movements on the crank, said elements having slotted free ends and a pair of stationary transverse pins extending respectively through the slotted end of the stripping elements of each crank shaft.

4. The combination with the suction nozzle of a pneumatic picker, of means for stripping the cotton from the boll, comprising a pair of crank shafts journaled transversely within the intake end of the nozzle, means for simultaneously driving the same at a constant rate of speed in opposite directions, complementary stripping elements having teeth on their confronting sides mounted for swinging movements on the crank, said elements having slotted free ends and a pair of stationary transverse pins extending respectively through the slotted end of the stripping elements of each crank shaft for effecting the movement of the teeth of said stripping elements in substantially oval paths longitudinally of the nozzle whereby said teeth will be advanced rapidly toward each other at the outermost limit of their movement to effect the stripping of the cotton from the boll and whereby the same will be advanced away from each other at a relatively reduced rate of speed during their remaining movements to permit of the complete removal of the cotton therefrom by the suction or draft through the nozzle.

JAMES P. ROACH.